US008089889B2

(12) United States Patent
Bayus et al.

(10) Patent No.: US 8,089,889 B2
(45) Date of Patent: Jan. 3, 2012

(54) ADAPTER PORT CONFIGURATION

(75) Inventors: Mark Steven Bayus, Tucson, AZ (US); Roger Gregory Hathorn, Tucson, AZ (US); Bernhard Laubli, Corona de Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1662 days.

(21) Appl. No.: 10/992,539

(22) Filed: Nov. 18, 2004

(65) Prior Publication Data

US 2006/0165116 A1    Jul. 27, 2006

(51) Int. Cl.
*G01R 31/08* (2006.01)

(52) U.S. Cl. .............. 370/252; 370/463

(58) Field of Classification Search ........... 370/252, 370/401, 402, 406, 463; 709/220, 223, 224, 709/226; 710/104, 305; 711/112
See application file for complete search history.

(56) References Cited

U.S. PATENT DOCUMENTS

| 6,647,010 | B1 | 11/2003 | Ford et al. ............. 370/391 |
| 6,721,872 | B1 | 4/2004 | Dunlop et al. ............. 712/28 |
| 6,865,387 | B2 | 3/2005 | Bucknell et al. |
| 6,898,202 | B2 | 5/2005 | Gallagher et al. ............. 370/401 |
| 7,103,712 | B2* | 9/2006 | Mizuno ............. 711/112 |
| 7,133,907 | B2* | 11/2006 | Carlson et al. ............. 709/220 |
| 7,143,615 | B2* | 12/2006 | Connor et al. ............. 370/352 |
| 7,506,040 | B1* | 3/2009 | Rabe et al. ............. 709/223 |
| 2002/0194407 | A1* | 12/2002 | Kim ............. 710/104 |
| 2004/0028063 | A1* | 2/2004 | Roy et al. ............. 370/402 |
| 2004/0054866 | A1 | 3/2004 | Blumenau et al. ............. 711/202 |
| 2004/0081196 | A1 | 4/2004 | Elliott ............. 370/465 |
| 2004/0143639 | A1 | 7/2004 | Rangan et al. ............. 709/212 |
| 2007/0283073 | A1* | 12/2007 | Doak et al. ............. 710/305 |

FOREIGN PATENT DOCUMENTS

TW    200510133    11/2002

* cited by examiner

*Primary Examiner* — Ricky Ngo
*Assistant Examiner* — Phuongchau B Nguyen
(74) *Attorney, Agent, or Firm* — Kunzler Needham Massey & Thorpe (57) ABSTRACT

An apparatus for configuring a port in a multi-port communication adapter includes a quiesce module quiescing communications at one or more first I/O ports of a multi-port communication adapter while allowing communications at one or more second I/O ports of the multi-port communication adapter. A path module removes one or more logical paths between the one or more first I/O ports and one or more remote adapters in anticipation of taking the one or more first I/O ports offline. The offline module takes offline the one or more first I/O ports. The update module updates a port resource of the one or more first I/O ports while allowing a concurrent communication on the one or more second I/O ports of the multi-port communication adapter.

30 Claims, 8 Drawing Sheets

ADAPTER PORT CONFIGURATION

BACKGROUND

1. Technological Field

This invention relates to communication adapters and more particularly relates to updating a port configuration on a multi-port communication adapter.

2. Background Technology

Users continue to require high availability from computer systems and computer subsystems. Web servers, database servers, application servers, and the like are expected to be available around the clock. Maintenance and upgrades to these systems should minimize time the system is offline, if at all. Additionally, components within these systems may be expected to be configurable to various operating environments.

For example, a communication adapter, which facilitates communications between two system components within a communication system, may be expected to be configurable to various topologies and protocols. As used herein, topology refers to the physical connections within the communication system. Common topologies include Point-to-Point, Fabric Switched, Fibre Channel Arbitrated Loop (FC-AL), and so forth. Protocol, as used herein, refers to the communication scheme employed to transfer data between system components. Common Upper Level Protocols (ULPs), including Fibre Channel Protocol (FCP) and FICON (FC-SB-2). Other topologies and protocols may be employed depending on the operation of the communication system.

A communication adapter typically includes a plurality of ports. Each port may be used for a physical connection to another system component. For example a host may be directly connected via a communication cable to port in a point-to-point topology. In another example, a port may facilitate a physical connection to a hub or a switch, which, in turn, may be connected to a host. Periodically, a communication adapter may be reconfigured to provide improved communications or support a different communication topology or protocol.

Figure 1:
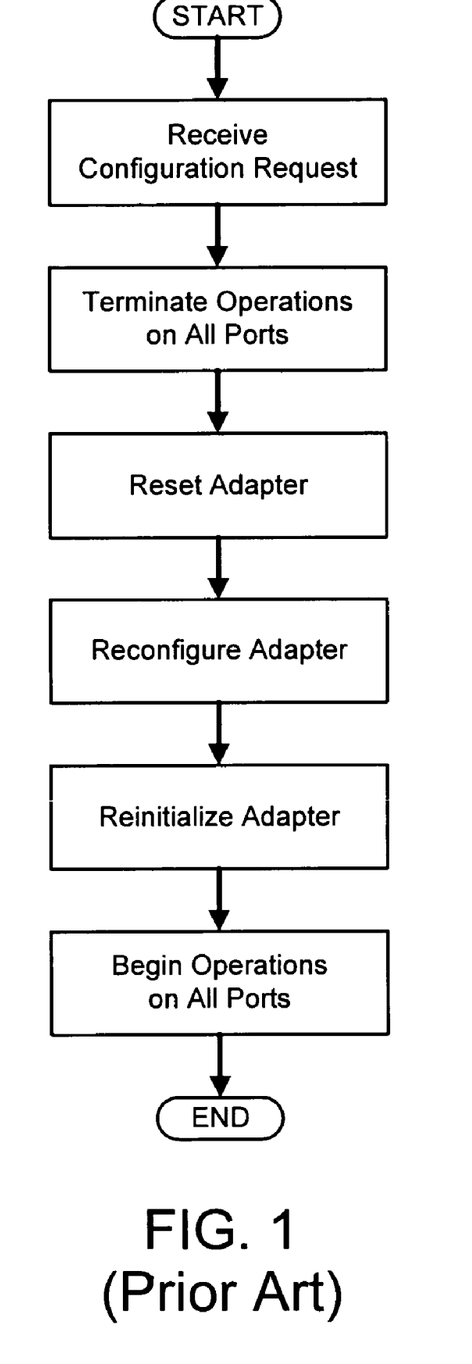
FIG. 1 is a schematic flow chart diagram illustrating a conventional adapter configuration method.

FIG. 1 depicts a conventional adapter configuration method. The standard technique for reconfiguring an adapter port includes receiving a configuration request at the adapter and terminating all operations on all ports of the adapter. A typical adapter may have four ports, for example. The adapter is then reset, reconfigured, and reinitialized with the new topology and/or protocol configuration. Subsequently, operations may be resumed on all of the ports of the adapter.

Unfortunately, the conventional adapter configuration method may require that all ports on the adapter be removed from communications in order to reconfigure even a single port. In this way, the reconfiguration of a port may prevent concurrent communications on other ports within the adapter. In other words, the reconfiguration of a port also may require termination of operations on ports that are not involved in the reconfiguration. Furthermore, the conventional adapter configuration method may require that all ports be configured at the same time.

From the foregoing discussion, it should be apparent that a need exists for an apparatus, system, and method for updating a port configuration on a communication adapter without preventing concurrent communications on other ports within the same communication adapter. Beneficially, such an apparatus, system, and method would overcome the present challenges associated with conventional port configuration technologies.

SUMMARY

An apparatus to configure a port is disclosed. A quiesce module quiesces communications at one or more first I/O ports of a multi-port communication adapter while allowing communications at one or more second I/O ports of the multi-port communication adapter. A path module coupled to the quiesce module removes one or more logical paths between the one or more first I/O ports and one or more remote adapters in anticipation of taking the one or more first I/O ports offline. An offline module coupled to the path module takes offline the one or more first I/O ports wherein the one or more second I/O ports remain online. An update module coupled to the offline module, the update module configured to update aport resource of the one or more first I/O ports while allowing a concurrent communication on the one or more second I/O ports of the multi-port communication adapter, wherein the port resource is one or more of a port topology and a port protocol, the update module enabled to update the one or more first I/O ports of the multi-port communication adapter while the one or more first I/O ports are offline, wherein the one or more second I/O ports of the multi-port communication adapter remain online during the updating of the one or more first I/O ports.

A system is also presented to configure a port. In one embodiment, the system may be embodied in a multi-port adapter having a plurality of ports, including a first port and a second port, and modules similar to those described above in relation to the apparatus.

Another embodiment of the system may be embodied in a communication system, including a storage system, a host, and a configuration apparatus. In one embodiment, the storage system includes a communication adapter having a plurality of ports, including a first port and a second port. The host may be coupled to the storage system via the second port. The configuration apparatus may includes similar modules to those described above in relation to the apparatus.

A non-transitory computer readable storage signal medium is also presented to store a program that, when executed, performs one or more operations to configure a port and perform functions of the apparatus.

A method is also presented for deploying a computing infrastructure. The computing infrastructure includes computer-readable code integrated into a computing system. In one embodiment, the computer-readable code, in combination with the computing system, is capable of configuring a port. In particular, the method in the disclosed embodiments substantially includes deploying code that enables the operations necessary to carry out the functions presented above with respect to the operation of the described apparatus.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered limiting of its scope, the invention will be described and explained with additional specificity and detail through the use of the accompanying drawings, in which.

DETAILED DESCRIPTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
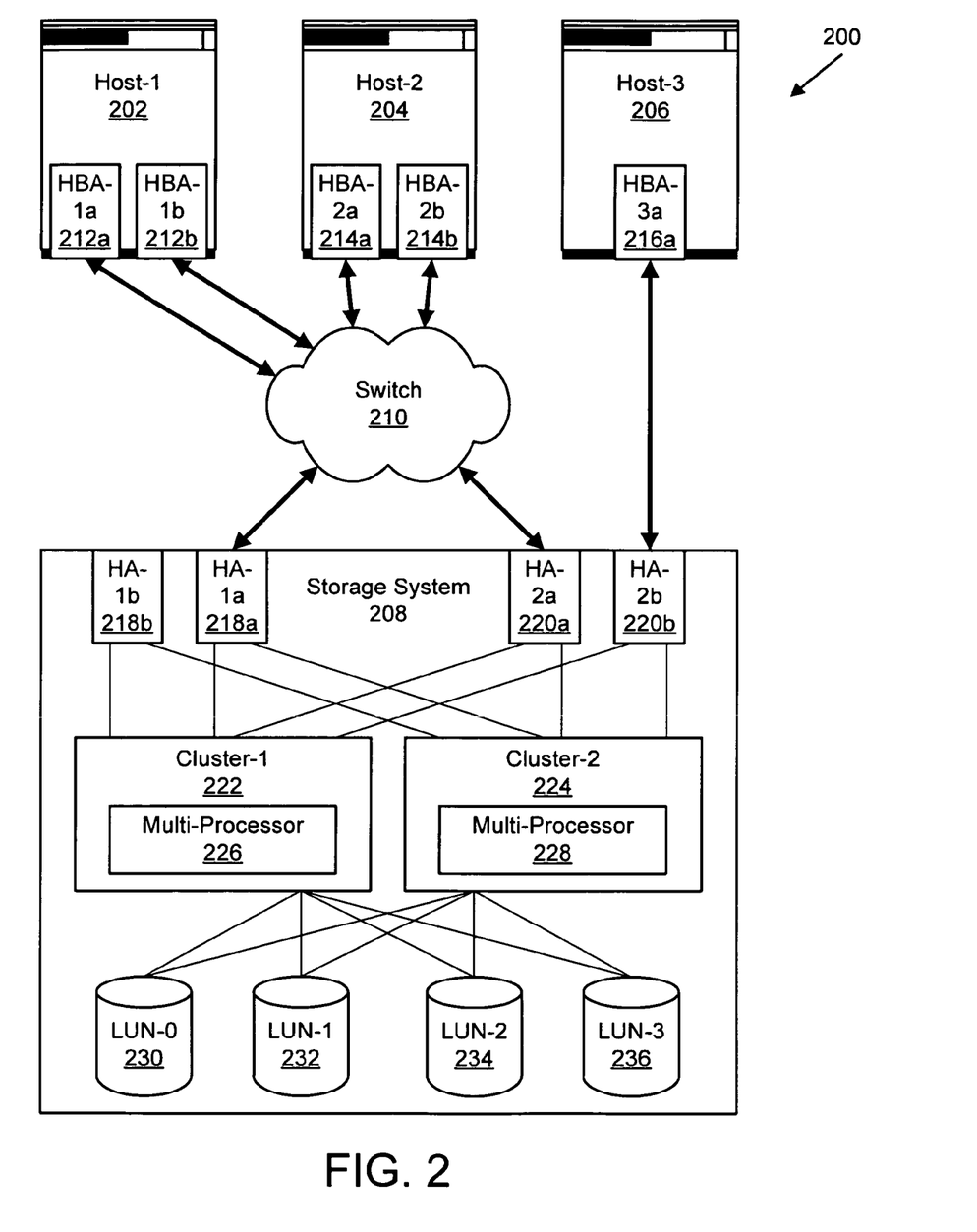
FIG. 2 is a schematic block diagram illustrating one embodiment of a communication system.

FIG. 2 depicts one embodiment of a communication system 200. The illustrated communication system 200 includes three hosts 202, 204, 206 connected to a storage system 208. The storage system 208, in one embodiment, is a storage server configured to store data. In an alternative embodiment, the communication system 200 may include multiple storage systems 208. The first and second hosts 202, 204 are redundantly connected to the storage system 208 via a switch 210. The third host 206 is directly connected to the storage system 208. Other potential connectivity equipment is omitted for clarity.

Although three hosts 202, 204, 206 are shown in the depicted embodiment, the communication system 200 may operate with fewer or more hosts 202, 204, 206 and storage systems 208. Additionally, the hosts 202, 204, 206 may be connected to the storage system 208 in alternate configurations of varying redundancy and directness. Furthermore, the illustrated cabling connections may comprise Fibre Channel, Enterprise System Connection® (ESCON), Fiber Connection (FICON) channel, Small Computer System Interface (SCSI), and the like. Additionally, the communication system 200 may be configured to support various topologies, including Point-to-Point, Fabric Switched, Fibre Channel Arbitrated Loop (FC-AL), and so forth. Furthermore, the communication system 200 may support various Upper Level Protocols (ULPs), including Fibre Channel Protocol (FCP) and FICON (FC-SB-2).

Each of the depicted hosts 202, 204, 206 includes one or more host bus adapters (HBAs) 212, 214, 216. Each HBA 212, 214, 216 is configured to manage most of the I/O operations required to transfer data between the corresponding host 202, 204, 206 and the storage system 208. In particular, each host bus adapter 212, 214, 216 is optimized to perform many I/O operations very rapidly with little or no involvement by the host 202, 204, 206, minimizing the workload on the host 202, 204, 206. The host bus adapters 212, 214, 216 also may be referred to as communication adapters.

The depicted storage system 208 includes multiple, redundant host adapters 218, 220 and clusters 222, 224. The host adapters 218, 220 are substantially similar to the host bus adapters 212, 214, 216, described above, and also may be referred to as communication adapters. Each cluster 222, 224 may include one or more multi-processors 226, 228 and connections to several logical unit numbers (LUNs) 230, 232, 234, 236. In a particular embodiment, one cluster 222 may primarily access the even LUNs 230, 234, while the other cluster 224 may primarily access the odd LUNs 232, 236. The redundant paths between host adapters 218, 220 and clusters 222, 224 and between multi-processors 226, 228 and LUNs 230, 232, 234, 236 allows for data storage and access in the case of a failure, such as a hardware failure. Additionally, the storage system 208 may employ a redundant array of independent disks (RAID) array, possibly mirroring and striping the stored data, as well as calculating and storing parity data.

Any reference to one of the illustrated hosts 202, 204, 206 is understood to refer to any or all of the hosts 202, 204, 206 unless explicitly noted otherwise. Likewise, any reference to one of the depicted host bus adapters 212, 214, 216 is understood to refer to any one or all of the communication adapters, including the host bus adapters 212, 214, 216 and/or the host adapters 218, 220 unless explicitly noted otherwise. Similarly, reference to one of the redundantly illustrated clusters 222, 224, multi-processors 226, 228, or LUNs 230, 232, 234, 236 is understood to refer to any of the corresponding devices, respectively, unless explicitly stated otherwise.

Throughout this specification, various embodiments will be described in relation to the processor(s) and memory used specifically in the host bus adapters 212, 214, 216 and host adapters 218, 220 for purposes of brevity and clarity in describing the present invention. The embodiments described herein are representative examples and are not intended to limit the scope of the present invention as defined by the claims. One of skill in the art will appreciate that certain embodiments may be implemented in any computer or electrical system that includes a processor such as a microprocessor, Application Specific Integrated Circuit (ASIC), or the like, that executes code images and allows the code images to be updated using a code overlay.

Figure 3:
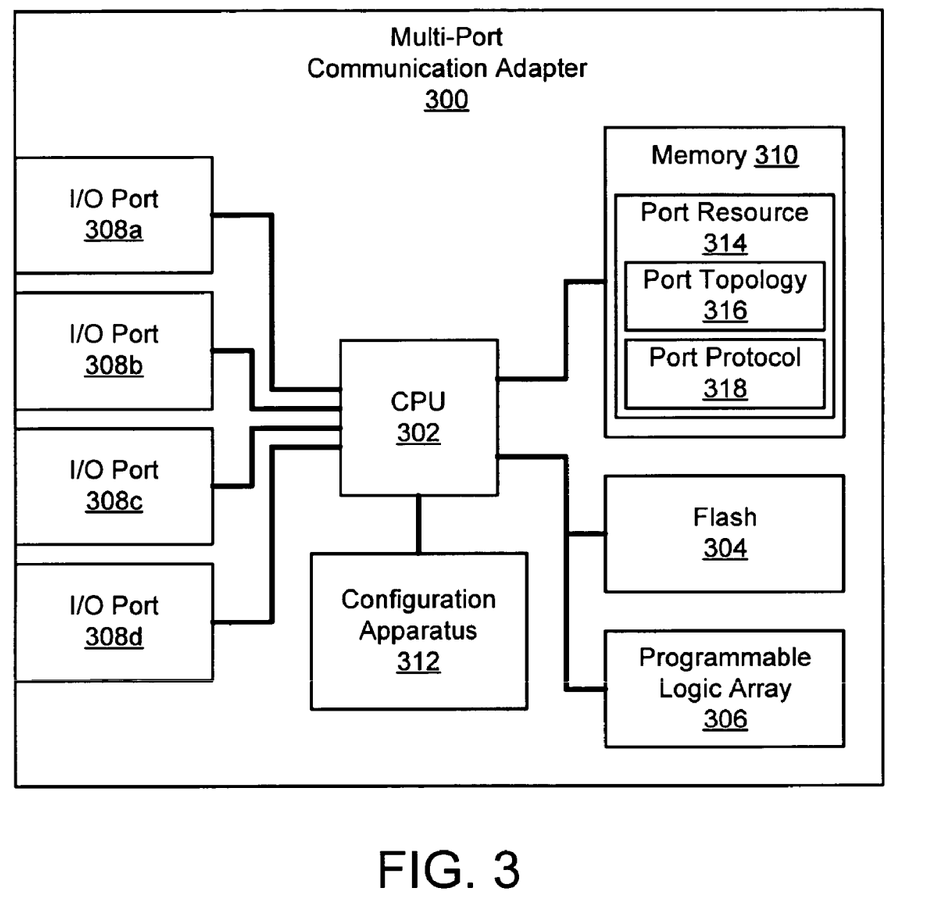
FIG. 3 is a schematic block diagram illustrating one embodiment of a multi-port communication adapter.

FIG. 3 depicts one embodiment of a multi-port communication adapter 300 that is substantially similar to the host adapters 218, 220 of FIG. 2. The illustrated communication adapter 300 includes a processor (CPU) 302, one or more flash memory devices 304, one or more programmable logic arrays (PLAs) 306, a plurality of I/O ports 308*a-d*, a local memory device 310, and a configuration apparatus 312. Although four I/O ports 308*a-d* are shown in FIG. 3, alternative embodiments of the multi-port communication adapter 300 may have fewer or more I/O ports 308. Any reference to one of the illustrated I/O ports 308a-d is understood to refer to any or all of the I/O ports 308a-d unless explicitly noted otherwise. One example of the configuration apparatus 312 is described in more detail with reference to FIG. 4.

In one embodiment, the electronic memory device 310 may store one or more port resources 314. For example, the electronic memory device 310 may store one port resource 314 for each I/O port 308. The port resource 314 includes attributes of the corresponding I/O port 308. In one embodiment, the port resource 314 may include a port topology attribute 316 and a port protocol attribute 318. The port topology attribute 316 is associated with the topology employed with the corresponding I/O port 308. Similarly, the port protocol attribute 318 is associated with the protocol employed with the corresponding I/O port 308.

In one embodiment, the multi-port communication adapter 300 performs high speed I/O operations, such as between a host 202 and the storage system 208. The CPU 202 is configured to execute operational instructions on the multi-port communication adapter 300. The flash memory devices 304 and PLAs 306 interact with the CPU 302 to properly perform I/O operations. Additionally, the I/O ports 308a-d allow the multi-port communication adapter 300 to communicate data and control information with other devices, such as a host 202. Such connections may be direct or via a hub, a switch 210, and/or other connectivity equipment. In one embodiment, the local memory device 310 may be high speed main memory such as Random Access Memory (RAM), Non-Volatile Random Access Memory (NVRAM), or the like.

Figure 4:
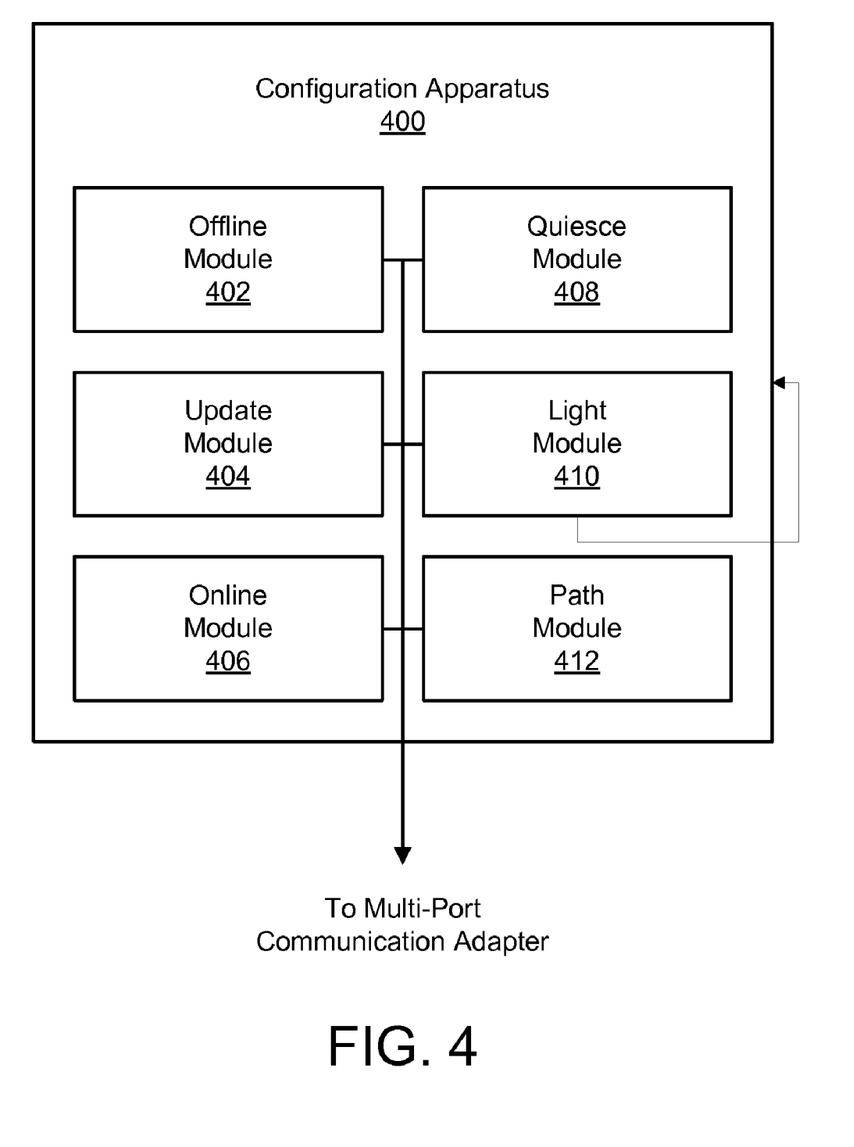
FIG. 4 is a schematic block diagram illustrating one embodiment of a configuration apparatus.

FIG. 4 depicts one embodiment of a configuration apparatus 400 that may be substantially similar to the configuration apparatus 312 of FIG. 3. The illustrated configuration apparatus 400 includes an offline module 402, an update module 404, an online module 406, a quiesce module 408, a light module 410, and a path module 412. Although one embodiment of the configuration apparatus 312 is depicted within the communication adapter 300, the configuration apparatus 400 or one or more modules of the configuration apparatus 400 may be coupled to the communication apparatus 300 and stored on a processor 226 or another device within or coupled to the storage system 208.

In one embodiment, the offline module 402 takes an I/O port 308a offline in anticipation of a reconfiguration of the I/O port 308a. The offline module 402 may be capable of taking offline a single port 308a, all of the ports 308a-d, or selected ports 308 in sequence or at the same time. In another embodiment, the offline module 402 may be configured to take an I/O port 308a offline for another reason, including in response a configuration request.

In one embodiment, the update module 404 updates a port resource 314 corresponding to the I/O port 308a that is take offline by the offline module 402. The update module 404 may operate without causing a disruption to the concurrent communications, if any, on each of other I/O ports 308b-d. As described above, the port resource 314 may include one or more port topology attributes 316 and/or one or more port protocol attributes 318.

In one embodiment, the port topology attribute 316 corresponds to a Fibre Channel arbitrated loop (FC-AL) topology. Alternatively, the port topology attribute 316 corresponds to a fabric point-to-point (P-P) topology. Alternatively, the port topology attribute 316 corresponds to another topology. In a further embodiment, the port topology attribute 316 may correspond to an unconfigured topology, indicating that the I/O port 308a is not configured for any topology in particular.

In one embodiment, the port protocol attribute 318 corresponds to a Fibre Channel Protocol (FCP). Alternatively, the port protocol attribute 318 corresponds to a Fiber Connection (FICON) protocol. Alternatively the port protocol attribute 318 corresponds to another protocol. In a further embodiment, the port protocol attribute 318 may correspond to an unconfigured protocol, indicating that the I/O port 308a is not configured for any protocol in particular.

In another embodiment, the update module 404 also minimizes any effects that the update operation might have on the concurrent communications by managing processor control thread allocation for the port resource 314 update. For example, the update module 404 may limit the number of threads that are sent to the processor 302 at a give time, thereby limiting the impact that the port resource 314 update might have on concurrent communications on the other I/O ports 308b-d. In one embodiment, the update module 404 may implement a queue to limit the number of threads that are sent to the processor 302.

In one embodiment, the online module 406 puts the updated I/O port 308a back online in response to the port resource 314 update. After the I/O port 308a is back online, the I/O port may facilitate data communications using the update port resource 314, including any updated port topology attributes 316 and/or port protocol attributes 318.

In one embodiment, the quiesce module 408 quiesces communications at the I/O port 308a to be configured. In another embodiment, the quiesce module 408 allows concurrent communications on the other ports 308b-d while the first port 308a is quiesced. In this way, the quiesce module 408 does not prevent concurrent communications on the other I/O ports 308b-d.

In one embodiment, the light module 410 turns off light at the I/O port 308a to be configured. In another embodiment, the light module 410 does not turn off light at the other ports 308b-d while the first port 308a is offline. In this way, the light module 410 does not prevent concurrent communications on the other I/O ports 308b-d.

In one embodiment, the path module 412 manages logical paths between the multi-port communication adapter 300 and a remote device, such as a host 202. More specifically, the path module 412 may manage a logical path between the I/O port 308a to be configured and a remote communication adapter, such as a host bus adapter (HBA) 212 on a remote host 202. In another embodiment, the path module 412 may remove the logical path in anticipation of the I/O port 308a being taken offline by the offline module 402.

Figure 5:
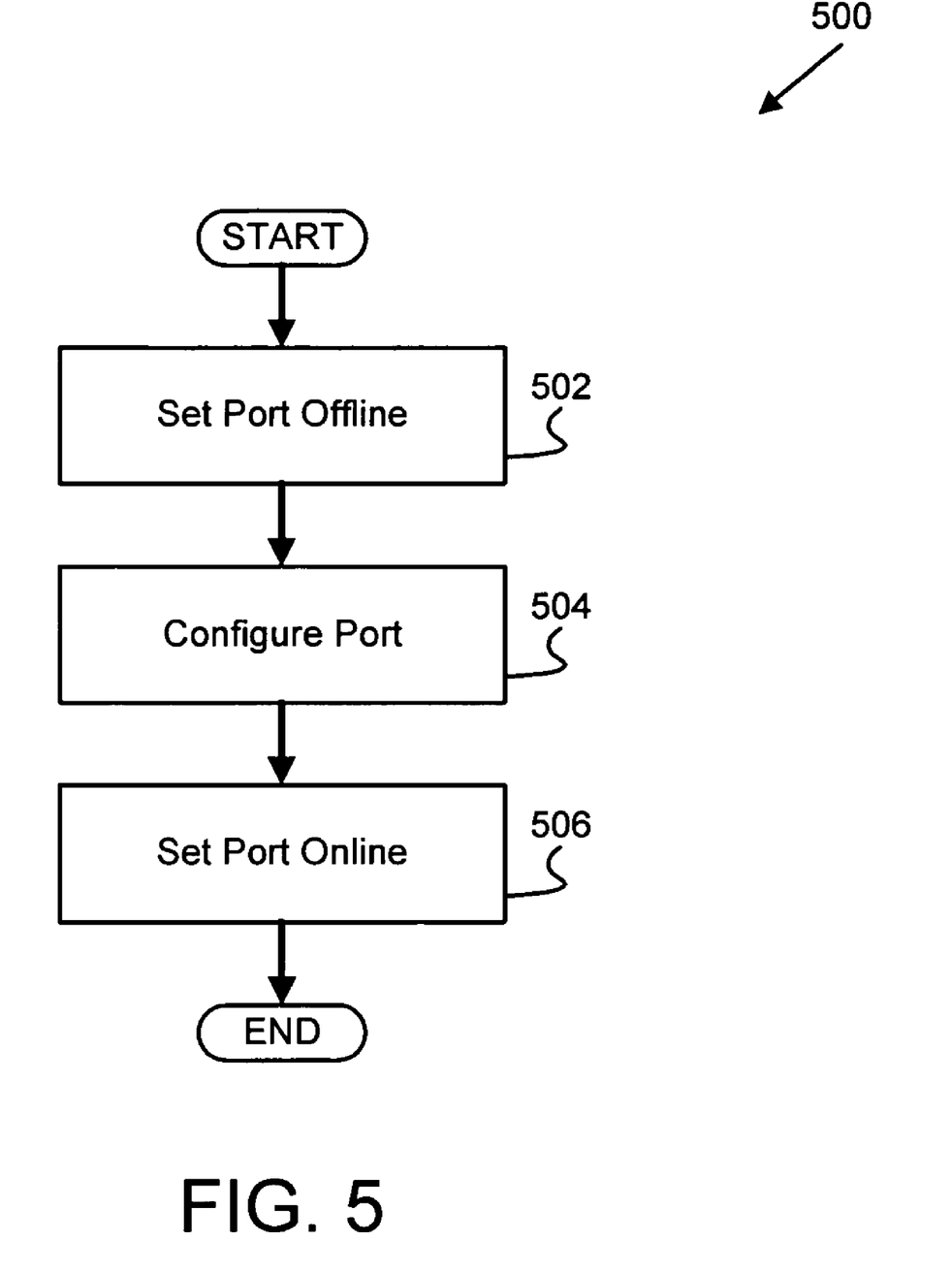
FIG. 5 is a schematic flow chart diagram illustrating one embodiment of a port configuration method.

FIG. 5 depicts one embodiment of a port configuration method 500 that may be implemented in conjunction with the configuration apparatus 400 of FIG. 4. In one embodiment, the illustrated port configuration method 500 may begin in response to a port configuration request. Such a port configuration request may be received from a web server or a management console (not shown) coupled to the storage system 208.

The offline module 402 takes the selected port 308a offline 502. As described above, a single I/O port 308a may be set offline 502 while the remaining I/O ports 308b-d on the multi-port communication adapter 300 remain online. A more detailed example of the offline operation 502 is described with reference to FIG. 6.

The update module 404 then configures 504 the selected I/O port 308a according to the configuration request or other commands received from the web server or management console. As described above, a single I/O port 308a may be reconfigured 504 while the remaining I/O ports 308b-d are not reconfigured. Additionally, a single I/O port 308a may be reconfigured while the remaining I/O ports 308b-d process concurrent data communications. A more detailed example of the configuration operation 504 is described with reference to FIG. 7.

In one embodiment, the online module 406 then puts the selected port 308a back online 506. As described above, a single I/O port 308a may be put back online 506 while the remaining I/O ports 308b-d remain online and are allowed to process concurrent communications. A more detailed example of the online operation 506 is described with reference to FIG. 8.

Figure 6:
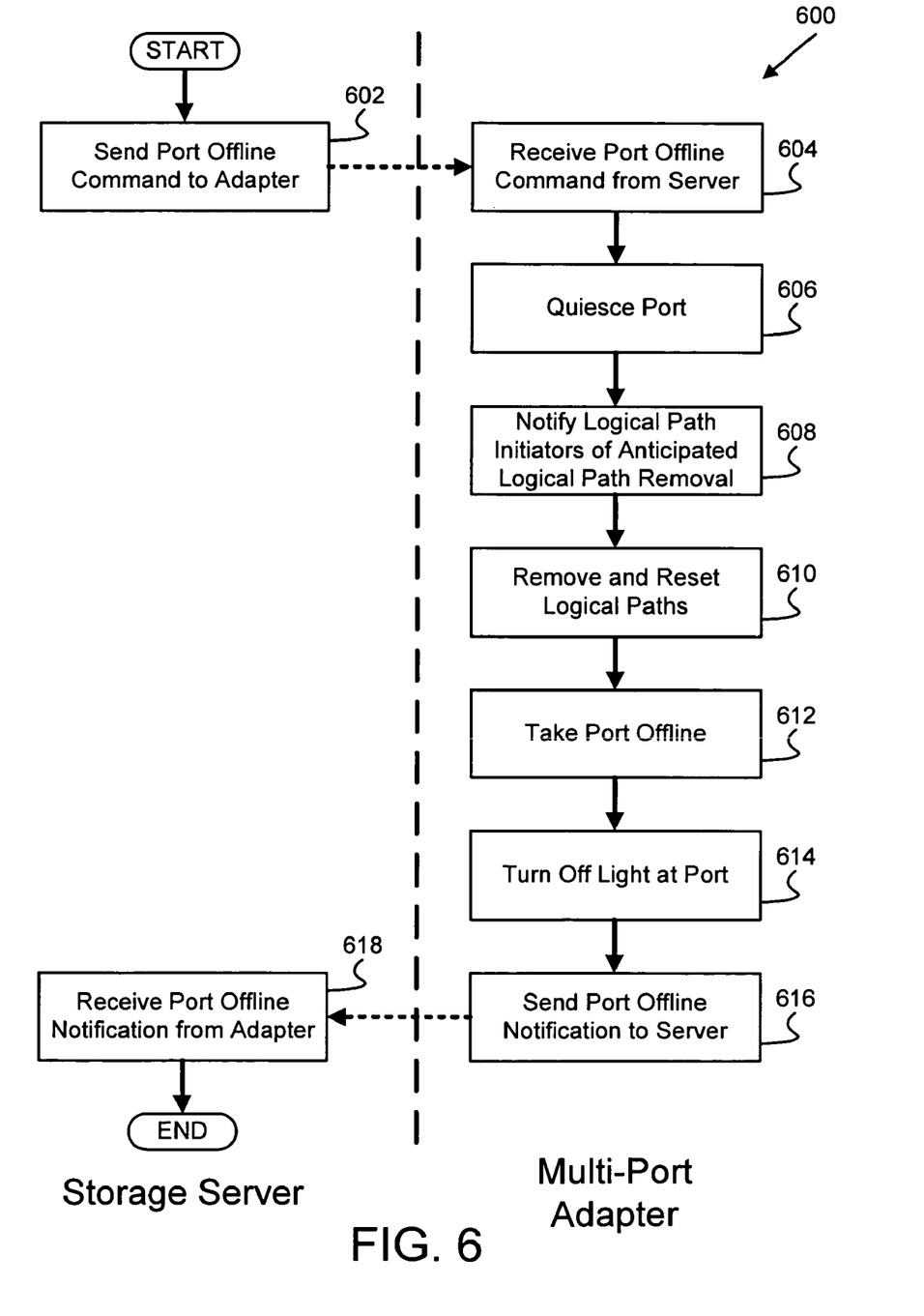
FIG. 6 is a schematic flow chart diagram illustrating one embodiment of a port offline method.

FIG. 6 depicts one embodiment of a port offline method 600 that is given by way of example of the offline operation 502 of the port configuration method 500 of FIG. 5. In general, the port offline method 600 may facilitate quiescing I/O activity on the selected port 308a and setting the port 308a physically offline, which includes, for example, dropping light on the Fibre Channel interface. In a more particular embodiment, the illustrated port offline method 600 begins and a storage server, such as the storage system 208, sends 602 a port offline command to the multi-port communication adapter 300 to take a specific port 808a offline. The adapter 300 then receives 604 the port offline command from the storage server 208. In one embodiment, the adapter 300 subsequently may notify a FICON ULP component that a specified port is being taken offline.

The adapter 300 then quiesces 606 I/O activity on the selected port 308a. In one embodiment, a FICON ULP performs the quiesce operation 606. In another embodiment, the quiesce module 408 may perform the quiesce operation 606. After the quiesce period is over, any leftover active tasks for the selected port 308a are terminated. The path module 412, in one embodiment, then notifies 608 all logical path initiators of the anticipated path removal and that the paths are going offline.

The path module 412 then removes 610 the logical paths for the selected port 308a and system resets are performed for these logical paths. Prior to going offline, the configuration apparatus 400 may perform other administrative operations, including notifying an FCP ULP component that the selected port 308a is being taken offline, terminating initiator activity, set remote port resources to be unregistered, removing physical logical path configuration information associated with the selected port 308a, and/or quiescing FCP I/O activity.

The offline module 402 then takes 612 the selected port 308a offline, which may include issuing commands to the selected port 308a to go offline. Additionally, the light module 410 turns off light 614 to the selected port 308a. As described above, however, taking 612 the port 308a offline and dropping 614 light to the port 308a do not necessarily affect the concurrent communications, if any, on other ports 308b-d on the multi-port communication adapter 300. In one embodiment, the selected port 308a is left in a state such that the port 308a retains critical configuration information, allowing the port 308a to subsequently be brought back online quickly without the need for a full configuration or reset of the adapter 300.

The multi-port communication adapter 300 then sends 616 a port offline notification to the storage server 208 indicating that the selected port 308a is offline. The storage server 208 then receives 618 the port offline notification from the adapter 300 and completes the port offline request. The depicted port offline method 600 then ends.

Figure 7:
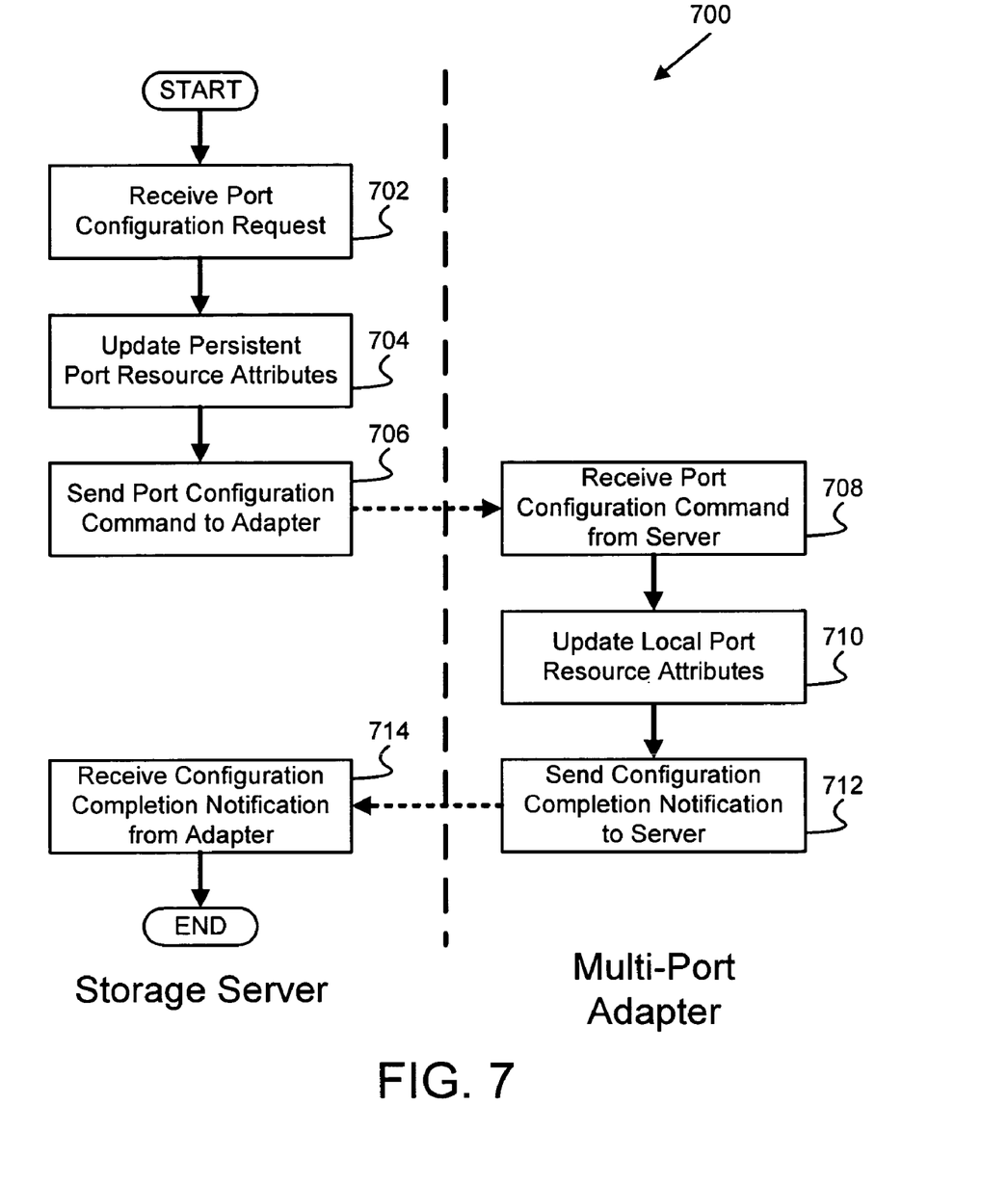
FIG. 7 is a schematic flow chart diagram illustrating one embodiment of a port update method.

FIG. 7 depicts one embodiment of port update method 700 that is given by way of example of the configuration operation 504 of the port configuration method 500 of FIG. 5. In general, the port update method 700 may facilitate setting the desired port topology and protocol attributes 316, 318 for a port resource 314 corresponding to the selected port 308a. In one embodiment, the port update method 700 begins in response to a port offline notification received 618 at the storage server 208.

In a more particular embodiment, the illustrated port update method 700 begins and the storage server 208 receives 702 a port configuration request from a user. In one embodiment, the port configuration request includes a port topology attribute 316 and/or a port protocol attribute 318. As described above, the port configuration request may be received 702 from a web server, management console, or other graphical user interface (GUI) application.

In response to the port configuration request, the storage server 208 may update 704 the port resource attributes 316, 318 in persistent memory on or coupled to the storage server 208. The storage server 208 then sends 706 the port configuration command to the multi-port communication adapter 300, which receives 708 the command and updates 710 the local port resource attributes 316, 318 according to the port configuration request. In one embodiment, the update module 404 updates the local port resource 314, including the port topology attribute 316 and/or the port protocol attribute 318.

The multi-port communication adapter 300 then sends 712 a configuration completion notification to the storage server 208, indicating that the port resource attributes 316, 318 for the selected port 308a are updated. The storage server 208 then receives 714 the configuration completion notification from the adapter 300 and completes the port configuration request. The depicted port update method 700 then ends.

Figure 8:
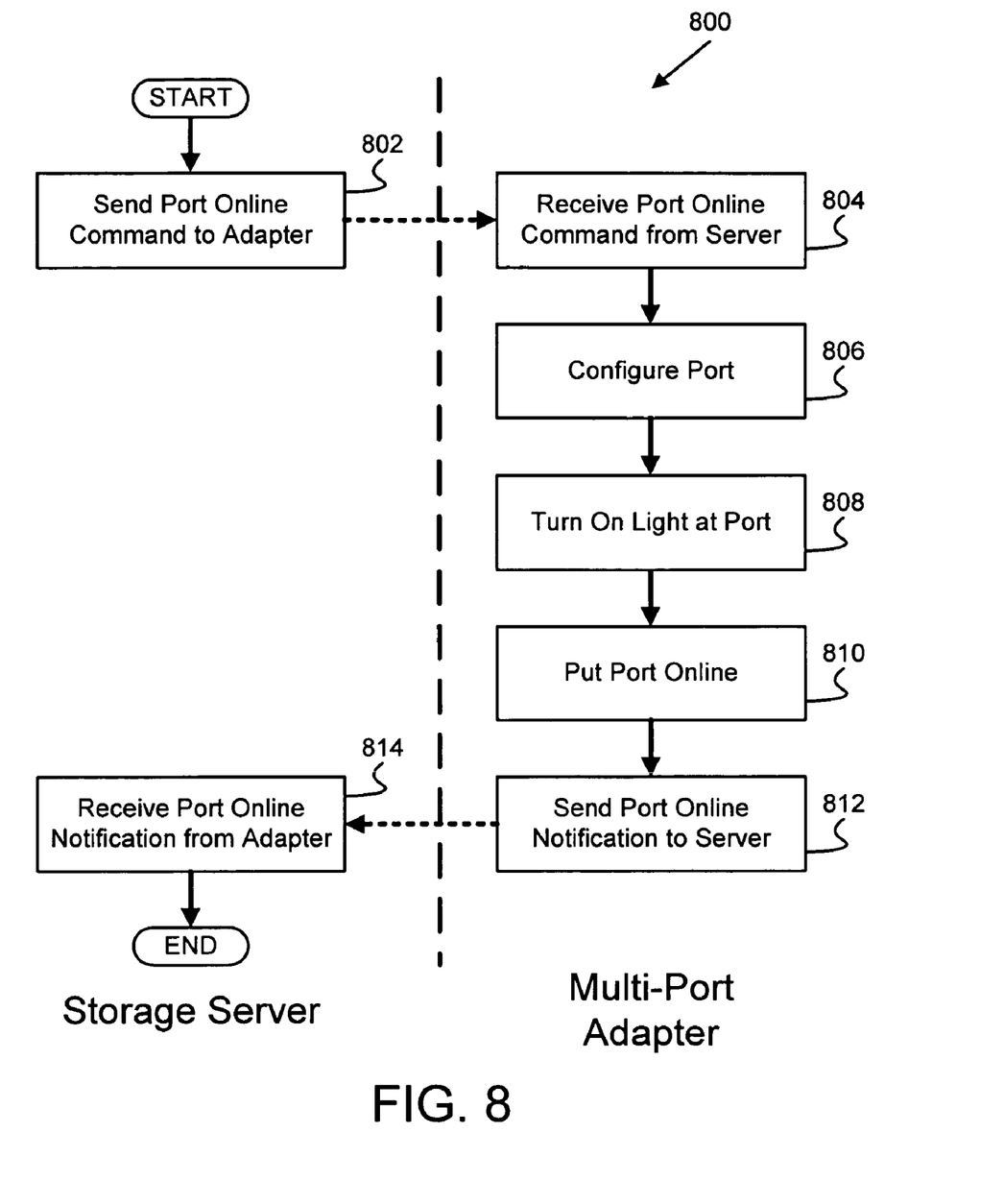
FIG. 8 is a schematic flow chart diagram illustrating one embodiment of a port online method.

FIG. 8 depicts one embodiment of a port online method 800 that is given by way of example of the online operation 506 of the port configuration method 500 of FIG. 5. In general, the port online method 800 may facilitate putting the selected port 308a back online with the updated port resource attributes 316, 318 after the port configuration. In one embodiment, the port online method 800 begins in response to a configuration completion notification received 714 at the storage server 208.

In a more particular embodiment, the illustrated port online method 800 begins and the storage server 208 sends 802 a port online command to the multi-port communication adapter 300. The adapter 300 then receives 804 the port online command from the storage server 208 and configures 806 the port 308a according to the updated port resource attributes 316, 318. In one embodiment, the update module 404 configures 806 the port 308a. In another embodiment, the adapter 300 may issue a command to asynchronously configure 806 the port 308a to bring it online. Other ports 308b-d on this adapter 300 may be allowed to continue uninterrupted, concurrent communication activity.

After the port configuration operation 806 completes, the light module 410 turns on light 808 at the selected port 308a and the online module 406 puts 810 the selected port 308a back online. The multi-port communication adapter 300 then sends 812 a port online notification to the storage server 208, indicating that the selected port 308a is back online. The storage server 208 then receives 814 the port online notification from the adapter 300 and completes the port online request. The depicted port online method 800 then ends.

Hence, it may be advantageous to provide a communication adapter 300 having a configuration apparatus 400 that selectively configures an I/O port 308a without interrupting concurrent communications of other I/O ports 308b-d on the same adapter 300. As described above, such a configuration apparatus 400 facilitates taking the selected port 308a offline, updating the port resource 314 for the selected port 308a, configuring the selected port 308a according to the updated resource attributes 316, 318, and putting the selected port 308a back online.

Various reasons may exist to update the port resource attributes 316, 318 associated with a particular I/O port 308a on a multi-port communication adapter 300. For example, new technology may be selectively implemented, within a communication system 200, that affects only a subset of the physical and/or logical paths between the storage server 208 and a host 202. The port resource attributes 316, 318 may be updated to accommodate only those new paths while maintaining existing port resource attributes 316, 318 for the unchanged paths.

Another reason arises in the case of shared hardware resources. For example, a single storage server 208, may be shared among multiple customers. The hardware of the corresponding communication system 200 is capable of maintaining connections to these multiple customers and switching between customers to allow different customers to have access to the storage server 208 at different times. For example, one customer may desire access during the day and another customer may desire access during the hours corresponding to the off hours of the first customer. Configuring single port 308a within a multi-port communication adapter 300 allows other customers connected to the other ports 308b-d on the same adapter 300 to continue concurrent communications while the first port 308a is reconfigured for the customer accessing the first port 308a.

In the case where the communication system 200 includes multiple storage servers 208, such as dual storage servers 208, the foregoing apparatus, system, and methods may be implemented on such communication system 200. For example, the port update method 700 may be implemented for multiple storage servers 208 to update port resources 314 in persistent memory coupled to each of the multiple storage servers 208. Other aspects of certain embodiments may be implemented over multiple storage servers 208 to take advantage of redundancy and performance benefits of a communication system 200 having multiple storage servers 208.

The schematic flow chart diagrams included herein are generally set forth as logical flow chart diagrams. As such, the depicted order and labeled operations are indicative of one embodiment of the presented method. Other operations and methods may be conceived that are equivalent in function, logic, or effect to one or more operations, or portions thereof, of the illustrated method. Additionally, the format and symbols employed are provided to explain the logical operations of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated operations of the depicted method. Additionally, the order in which a particular method occurs may or may not strictly adhere to the order of the corresponding operations shown.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to configure a port, the apparatus comprising:
    a quiesce module configured to quiesce communications at one or more first I/O ports of a multi-port communication adapter while allowing communications at one or more second I/O ports of the multi-port communication adapter;
    a path module coupled to the quiesce module, the path module configured to remove one or more logical paths between the one or more first I/O ports and one or more remote adapters in anticipation of taking the one or more first I/O ports offline;
    an offline module coupled to the path module, the offline module configured to take offline the one or more first I/O ports wherein the one or more second I/O ports remain online; and
    an update module coupled to the offline module, the update module configured to update a port resource of the one or more first I/O ports while allowing a concurrent communication on the one or more second I/O ports of the multi-port communication adapter, wherein the port resource is one or more of a port topology and a port protocol, the update module enabled to update the one or more first I/O ports of the multi-port communication adapter while the one or more first I/O ports are offline, wherein the one or more second I/O ports of the multi-port communication adapter remain online during the updating of the one or more first I/O ports;
    wherein at least a portion of the offline module and the update module comprise one or more of logic hardware and executable code, the executable code stored on non-transitory computer readable storage media.

2. The apparatus of claim 1, further comprising an online module coupled to the update module, the online module configured to put the one or more first I/O ports online in response to the port resource update.

3. The apparatus of claim 1, wherein the port topology comprises one of a Fibre Channel arbitrated loop (FC-AL) topology, a fabric point-to-point (P-P) topology, and an unconfigured topology.

4. The apparatus of claim 1, wherein the port protocol comprises one of a Fibre Channel Protocol (FCP), a Fiber Connection (FICON) protocol, and an unconfigured protocol.

5. The apparatus of claim 1, further comprising a light module coupled to the offline module, the light module configured to turn off light at the first I/O port while maintaining light on at the one or more second I/O ports.

6. The apparatus of claim 1, wherein the path module is configured to manage the one or more logical paths between the one or more first I/O ports and the one or more remote adapters.

7. The apparatus of claim 1, wherein the update module is further configured to minimize, through management of processor control thread allocation for the port resource update, any decrease in processing performance of communications at the one or more second I/O ports due to the port resource update.

8. A system to configure a port, the system comprising:
a multi-port adapter having a plurality of ports, including one or more first I/O ports and one or more second I/O ports;
a configuration apparatus coupled to the multi-port communication adapter, the configuration apparatus comprising
a quiesce module configured to quiesce communications at the one or more first I/O ports while allowing communications at the one or more second I/O ports;
a path module coupled to the quiesce module, the path module configured to remove one or more logical paths between the one or more first I/O ports and one or more remote adapters in anticipation of taking the one or more first I/O ports offline;
an offline module coupled to the path module, the offline module configured to take offline the one or more first I/O ports wherein the one or more second I/O ports remain online; and
an update module coupled to the offline module, the update module configured to update a port resource of the one or more first I/O ports while allowing a concurrent communication on the one or more second I/O ports of the multi-port communication adapter, wherein the port resource is one or more of a port topology and a port protocol, the update module enabled to update the one or more first I/O ports of the multi-port communication adapter while the one or more first I/O ports are offline, wherein the one or more second I/O ports of the multi-port communication adapter remain online during the updating of the one or more first I/O ports.

9. The system of claim 8, further comprising an electronic memory device to store the port resource.

10. The system of claim 8, wherein the port topology comprises one of a Fibre Channel arbitrated loop (FC-AL) topology, a fabric point-to-point (P-P) topology, and an unconfigured topology.

11. The system of claim 8, wherein the port protocol comprises one of a Fibre Channel Protocol (FCP), a Fiber Connection (FICON) protocol, and an unconfigured protocol.

12. The system of claim 8, further comprising a light module coupled to the offline module, the light module configured to turn off light at the one or more first I/O ports while maintaining light on at the one or more second I/O ports.

13. A system to configure a port, the system comprising:
a storage system having a communication adapter, the communication adapter having a plurality of I/O ports, including a first I/O port and a second I/O port;
a host coupled to the storage system via the second I/O port; and
a configuration apparatus coupled to the communication adapter, the configuration apparatus configured to update a port configuration of the first I/O port and maintain an existing port configuration of the second I/O port, the configuration apparatus comprising:
a quiesce module configured to quiesce communications at the first I/O port while allowing communications at the second I/O port;
a path module coupled to the quiesce module, the path module configured to remove one or more logical paths between the one or more first I/O ports and one or more remote adapters in anticipation of taking the one or more first I/O ports offline;
an offline module coupled to the path module, the offline module configured to take offline the first I/O port wherein the second I/O port remains online; and
an update module coupled to the offline module, the update module configured to update a port resource of the first I/O port while allowing a concurrent communication on the second I/O port of the multi-port communication adapter, wherein the port resource is one or more of a port topology and a port protocol, the update module enabled to update the first I/O port of the multi-port communication adapter while the first I/O port is offline, wherein the second I/O port of the multi-port communication adapter remain online during the updating of the first I/O port.

14. The system of claim 13, further comprising a processor within the storage system, the processor configured to process a data communication between the host and the second port during the port configuration update of the first I/O port.

15. The system of claim 13, further comprising a light module coupled to the offline module, the light module configured to turn off light at the first I/O port while maintaining light on the second I/O port.

16. A non-transitory computer readable storage medium tangibly embodying a program of machine-readable instructions executable by a digital processing apparatus to perform operations to configure a port, the operations comprising:
quiescing communications at one or more first I/O ports of a multi-port communication adapter while allowing communications at one or more second I/O ports of the multi-port communication adapter;
removing one or more logical paths between the one or more first I/O ports and one or more remote adapters in anticipation of taking the one or more first I/O ports offline;
taking offline the one or more first I/O ports, wherein the one or more second I/O ports of the multi-port communication adapter remain online; and
updating a port resource of the one or more first I/O ports while allowing a concurrent communication on the one or more second I/O ports of the multi-port communication adapter, wherein the port resource is one or more of a port topology and a port protocol, wherein the one or more first I/O ports are updated while the one or more first I/O ports are offline wherein the one or more second I/O ports remain online during the update of the one or more first I/O ports.

17. The computer readable storage medium of claim 16, wherein the instructions further comprise an operation to put the one or more first I/O ports online in response to the port resource update.

18. The computer readable storage medium of claim 16, wherein the instructions further comprise an operation to manage processor control thread allocation for the port resource update.

19. The computer readable storage medium of claim 16, wherein the instructions further comprise an operation to quiesce communications at the one or more first I/O ports while allowing communications at the one or more second I/O ports.

20. The computer readable storage medium of claim 16, wherein the instructions further comprise an operation to turn off light at the one or more first I/O ports while maintaining light on at the one or more second I/O ports.

21. The computer readable storage medium of claim 16, wherein the instructions further comprise an operation to manage the one or more logical paths between the one or more first I/O ports and the one or more remote adapters.

22. A method for deploying computer infrastructure, comprising integrating computer-readable code into a computing system, wherein the code in combination with the computing system is capable of configuring a port by performing the following:
    quiescing communications at one or more first I/O ports of a multi-port communication adapter while allowing communications at one or more second I/O ports of the multi-port communication adapter;
    removing one or more logical paths between the one or more first I/O ports and one or more remote adapters in anticipation of taking the one or more first I/O ports offline;
    taking offline the one or more first I/O ports, wherein the one or more second I/O ports of the multi-port communication adapter remain online; and
    updating a port resource of the one or more first I/O ports while allowing a concurrent communication on the one or more second I/O ports of the multi-port communication adapter, wherein the port resource is one or more of a port topology and a port protocol, wherein the one or more first I/O ports updated while the one or more first I/O ports are offline wherein the one or more second I/O ports remain online during the update of the one or more first I/O ports.

23. The method of claim 22, wherein the code in combination with the computing system is further capable of putting the one or more first I/O ports online in response to the port resource update.

24. The method of claim 22, wherein the code in combination with the computing system is further capable of managing processor control thread allocation for the port resource update.

25. The method of claim 22, further comprising turning off light at the one or more first I/O ports while maintaining light on at the one or more second I/O ports.

26. The method of claim 22, wherein the port topology comprises one of a Fibre Channel arbitrated loop (FC-AL) topology, a fabric point-to-point (P-P) topology, and an unconfigured topology.

27. The method of claim 22, wherein the port protocol comprises one of a Fibre Channel Protocol (FCP), a Fiber Connection (FICON) protocol, and an unconfigured protocol.

28. An apparatus to configure a port, the apparatus comprising:
    means for quiescing communications at one or more first I/O ports of a multi-port communication adapter while allowing communications at one or more second I/O ports of the multi-port communication adapter;
    means for removing one or more logical paths between the one or more first I/O ports and one or more remote adapters in anticipation of taking the one or more first I/O ports offline;
    means for taking offline the one or more first I/O ports wherein the one or more second I/O ports remain online; and
    means for updating a port resource of the one or more first I/O ports while allowing a concurrent communication on the one or more second I/O ports of the multi-port communication adapter, wherein the port resource is one or more of a port topology and a port protocol, the means for updating a port resource enabled to update the one or more first I/O ports of the multi-port communication adapter while the one or more first I/O ports are offline, wherein the one or more second I/O ports of the multi-port communication adapter remain online during the updating of the one or more first I/O ports;
    wherein at least a portion of the offline means and the update means comprise one or more of logic hardware and executable code, the executable code stored on non-transitory computer readable storage media.

29. The apparatus of claim 28, further comprising means for minimizing any decrease in processing performance of communications at the one or more second I/O ports due to the port resource update of the one or more first I/O ports.

30. The apparatus of claim 28, further comprising means for managing processor control thread allocation for the port resource update.

* * * * *